United States Patent [19]

Patterson et al.

[11] 3,839,231

[45] Oct. 1, 1974

[54] AIR FIREABLE COMPOSITIONS CONTAINING VANADIUM OXIDE AND BORON SILICIDE, AND DEVICES THEREFROM

[75] Inventors: Frank Knowles Patterson; Stephen Charles Thayer, both of Wilmington, Del.

[73] Assignee: E. I. du Pont de Nemours and Company, Wilmington, Del.

[22] Filed: Apr. 27, 1972

[21] Appl. No.: 248,115

[52] U.S. Cl. .................... 252/514, 252/518, 106/52

[51] Int. Cl. .................... H01b 1/02

[58] Field of Search .................... 252/518, 512, 514

[56] References Cited

UNITED STATES PATENTS

| | | | |
|---|---|---|---|
| 3,261,697 | 7/1966 | Parker et al. | 106/56 |
| 3,321,727 | 5/1967 | Schnewelius | 338/330 |
| 3,622,523 | 11/1971 | Amin | 252/514 |

OTHER PUBLICATIONS

Chem. Abstracts, Vol. 58, Col. 9942g (1963).

*Primary Examiner*—John D. Welsh

[57] ABSTRACT

Screen printable, air fireable compositions comprising (1) vanadium glass or a product of silica and vanadium glass, (2) boron silicide and (3), as optional components, boron, noble metal and/or a low melting inorganic binder, wherein the glass contains 5–55 percent vanadium metal content. Electronic devices are made from these compositions. A unique feature of the devices is their sensitivity to voltage as well as temperature. Consequently, the fired compositions are particularly useful wherever switching devices are needed, e.g., as transient suppressors in electronic equipment. A process for making electrical devices by firing subject compositions on substrates in a belt furnace.

8 Claims, No Drawings

AIR FIREABLE COMPOSITIONS CONTAINING VANADIUM OXIDE AND BORON SILICIDE, AND DEVICES THEREFROM

BACKGROUND OF THE INVENTION

This invention relates to electronic circuitry, and more particularly to vanadium compositions and devices thereof.

Vanadium dioxide ($VO_2$ or $V_2O_4$) has a phase transition temperature at about 68°C., where the monoclinic structure of its low temperature phase changes to the tetragonal rutile structure of its high temperature phase. This transition is best described as a transition from a first order semiconductor to a metallic conductor. The change in electrical resistance observed between the two states is approximately three orders of magnitude.

U.S. Pat. No. 3,402,131 describes a resistor based on vanadium dioxide having an abruptly changing negative temperature coefficient. The process requires three different firing steps, i.e., (1) vanadium pentoxide is fused with other oxides in air at a temperature between 670°–1,000°C., (2) the fused product is fired in a reducing atmosphere of ammonia at a temperature within the range of 350°–400°C. in order to transform $V_2O_5$ into $V_2O_4$; and (3) the fused product is sintered at 1,000°C. in an inert or reducing atmosphere to finally shape the product as beads, rods, discs or flakes. The patent does not relate to or describe printable, air fireable compositions which can be used to form thick film (e.g., screen or stencil printed) electrical devices.

Attempts have been made to make thin film switching elements of $VO_2$ (e.g., vacuum deposition or sputtering). K. van Steensel et al. have described such switching elements in Phillips Research Reports 22, pages 170–177 (1967). However, a thin film element cannot carry large quantities of power in comparison to thick films, and thin film processing in exacting and time consuming. Therefore, there is a need for a thick film composition which can be screen printed and air fired. Such a composition would make it very convenient to make various complicated configurations of switching elements and electrode assemblies.

Amin and Hoffman U.S. Pat. No. 3,622,523 provides screen printable, air fireable compositions comprising a vanadium glass, boron and optional ingredients, fireable at about 600°–900°C. for 1–20 minutes. At column 3, lines 50–52, the patentees caution potential oxidation to $V_2O_5$ (which does not exhibit a semiconductor to metal transition). Compositions more stable against oxidation during long-term firing are desirable. Such compositions are provided by the present invention.

SUMMARY OF THE INVENTION

This invention relates to improved screen printable, air fireable compositions comprising, on a weight basis, (1) 35–99 percent of a material selected from the class consisting of a finely divided vanadium glass and a powdery product of vanadium glass and silica, (2) 1–15 percent finely divided compound(s) of the formula $B_xSi$, where $x$ is about 4–6, (3) 0–50 percent of finely divided noble metal, and (4) 0–20 percent low melting inorganic binder; wherein vanadium glass (1) contains 5–55 percent vanadium, calculated as metal; and wherein said powdery product of vanadium glass and silica is obtained by heating vanadium glass and silica at or above the softening point of the vanadium glass, the silica having an average particle size of no more than about 40 microns, the amount of silica used to produce said powdery product being no more than about 40 percent of the weight of the vanadium glass therein.

Also of this invention are such compositions wherein component (2) additionally comprises finely divided boron with one or more compounds $B_xSi$ in finely divided form, the total amount of boron and $B_xSi$ being in the range 1–15 percent, and the total amount of elemental boron in component (2) being no more than about 40 percent of the total weight of component (2).

Dispersions of such compositions in inert liquid vehicle are also a part of this invention. In addition, various electrical devices made by firing the above-described compositions onto a substrate are part of this invention.

A glass batch containing oxides of vanadium and other normal glass constituents is melted in air at a suitable temperature and the molten glass is quickly cooled to prevent crystallization. This vanadium glass is finely ground, and optionally reacted with $SiO_2$ as described below. In either case, this component is mixed with the necessary amount finely divided boron silicide and, optionally, finely divided boron, noble metal and/or inorganic binder, and dispersed in a liquid vehicle to make a printable paste. An electrical element resulting from the printing and firing of the paste is a sintered product having a $VO_2$ component which imparts a large useful change in resistance over a short temperature range. Devices based on these printed elements have been found to be excellent transient suppression resistors. Any electronic instruments comprising delicate components such as transistors, require protection against overvoltage surges. The devices of this invention, when arranged in parallel circuit with such instruments, will allow normal operation of the instrument at a rated voltage while any overvoltage surge will internally heat the device and transform the device to a low resistance metallic state. Consequently, most of the overvoltage surge will pass through the device rather than through the delicate electronic component. In general, the screen printed, air fireable devices of this invention can be used wherever switching devices are needed. The FIGS. in U.S. Pat. No. 3,622,523 indicate the temperature resistance characteristics obtainable with the improved compositions of the present invention, at harsher firing conditions then employed with the compositions of the patent.

Also a part of this invention is a process for firing such compositions and compositions containing up to 90 percent boron in component (2) in a belt furnace at temperatures up to about 760°C. for furnace residence times of 30 minutes or more (5–10 minutes at peak temperature).

DETAILED DESCRIPTION

The compositions and devices of the present invention represent an improvement over the compositions and devices of U.S. Pat. No. 3,622,523. The improvement resides in the use of boron silicides ($B_xSi$) instead of boron in component (2), and optionally in the use of the aforesaid powdery product of vanadium glass and silica in component (1).

It is believed that the boron silicides, $B_xSi$ (principally $B_4Si$ and $B_6Si$), act as reducing agents for the higher valent vanadium ($V^{+5}$) present in the vanadate glasses; the boron silicides reduce the $V^{+5}$ to the tetravalent state ($V^{+4}$), whereupon the active component of the thermal switch, $VO_2$, crystallizes out. In all probability, the most important feature of the $B_xSi$ additives is the stabilization of the $Vo_2$ against oxidation to $V_2O_5$. This stabilization is believed to be derived from a protective borosilicate matrix provided by the oxidation of the boron silicides. This stabilization feature allows for higher temperature firing and longer firing times than does the use of boron alone. This is especially important for preparing $VO_2$ thermal switches by normal thick film processing techniques via belt furnace firing which involve long term (e.g., 30–45 minutes), high temperature firing cycles.

The optional improved feature in the present invention of using a powdery product (described below) of vanadium glass and silica results in further improved reproducibility in switching characteristics of thermal switches when processed by thick film techniques via belt furnace (long-term) firing profiles.

The vanadium glass itself is as used in U.S. Pat. No. 3,622,523, and contains different ingredients in varying proportions, but all of the glasses require the presence of 5–55 percent vanadium metal, preferably in the form of an oxide. When the glass is ultimately fired as a component of the novel compositions, $VO_2$ ($V_2O_4$) is formed in place. The amount of $VO_2$ formed is mainly determined by the amount of vanadium metal present in the glass. For this reason, the glass is defined on the basis of vanadium metal content.

In preparing the glass, vanadium metal or any oxide of vanadium may be used as one of the batch constituents. Vanadium pentoxide is the most convenient to utilize because it has the lowest melting point and is the least expensive. The low melting point of $V_2O_5$ (690°C.) makes it much easier to melt a variety of the common glass constituents in air. The other components of the vanadium glass can be any of the normal glass constituents which are well known in the art. Some of the glass constituents, other than vanadium oxide, include CaO, MgO, BaO, SrO, PbO, CdO, ZnO, $Na_2O$, $Li_2O$, $Al_2O_3$, $Ga_2O_3$, $Cr_2O_3$, $B_2O_3$, $P_2O_5$, $Ta_2O_5$, $RuO_2$, $TiO_2$, $SiO_2$, $GeO_2$, $WO_3$ and $MoO_3$.

The vanadium glass can be produced by melting suitable batch compositions yielding the prescribed metallic oxides and proportions thereof. The melting of the glass batch can be carried in a variety of furnaces, such as gas or electric. A container such as a platinum or refractory crucible can be utilized to melt the glass batch. The melting temperature of the glass batch will, of course, vary depending upon the composition of the batch. When a homogeneous molten liquid is obtained, the liquid is quickly cooled to retain the glassy structure of the composition. Glass frits are generally prepared by melting the glass batch composed of the desired metal oxides, or compounds which will produce the glass during melting, and pouring the melt into water. The coarse frit is then milled to a powder of the desired fineness.

Component (1) in the printable compositions of the present invention may, instead of the vanadium glass or in addition thereto, comprise a powdery product of fused glass and silica. The exact nature of this product is uncertain, but it is produced by heating finely divided vanadium glass and silica at or above the softening point of the vanadium glass, even above the melting or fusion point of the glass. The temperature is below the fusion point of silica. The silica has as average particle size no more than about 40 microns, and preferably has an average particle size less than 10 microns. The amount of silica used to produce said powdery product is no more than about 40 percent of the weight of the glass used, and is preferably about 10–25 percent thereof.

The powdery product is a free flowing powder, which is then mixed with the aforementioned boron silicides to make the compositions of the present invention. Although not intended to be limiting, it is theorized that perhaps the use of this powdery product of glass/$SiO_2$ either increases the fusion temperature of the vanadium glass or prevents particle fusion by absorption of the glass on the surface of the silica.

Should the reaction of silica and glass be conducted under such time/temperature conditions that a fused mass results, the fused mass can be ground and used in the present invention.

The boron silicide component of the composition has the formula $B_xSi$, where $x$ is about 4–6. $B_6Si$ and $B_4Si$ are easily obtainable. Certain amounts of boron may also be used. Thus, component (2) of the compositions of the present invention may, e.g., be $B_4Si$, $B_6Si$, $B_4Si/B$, $B_4Si/B_6Si/B$, $B_6Si/B$, provided the total amount is in the range 1–15 percent. The amount of elemental boron is in range of up to about 40 percent of the total weight of component (2). In the belt furnace firing process of the present invention, up to 90 percent boron may be employed provided the firing time and temperature are not too harsh.

While this invention is not based on any particular theory, it is believed that the boron silicide (and optional boron) acts as a reducing agent for the oxides of vanadium, which may be present in the glass, to form $VO_2$ in place by reduction. At least 1 percent is present to produce $VO_2$-based devices which exhibit a transition from a semiconductor to a metallic state. At the other extreme, excessive amounts of component (2), i.e., more than 15 percent, react with $VO_2$ and other oxide components during the firing operation. This does not lead to any large useful change in resistance on heating. Therefore, the amount of component (2) present in the screen printable, air fireable compositions of this invention should conform with the above-described limits, plus or minus a few percent.

It has also been discovered that a noble metal powder can, optionally, be included in the compositions of this invention. The nobel metals include gold, silver, platinum, palladium, osmium, iridium, ruthenium, rhodium, alloys thereof and mixtures thereof. The noble metal lowers the resistance of the $VO_2$-containing element in both the state that is above and below the transition temperature of $VO_2$. A lower resistance above the transition temperature of the $Vo_2$-containing element allows larger currents to pass through the fired elements without burning up the elements. Thus, the nobel metal additions increase power-carrying capacity of the $VO_2$-containing elements in the "switched on" condition. The amount of noble metal may range between 0–50 percent. The use of more than 50 percent metal does not provide any additional power-carrying capacity while increasing the cost of the elements.

Another optional component is a low melting inorganic binder. It has been found desirable, althoug not necessary, to include a sintering-promoting inorganic binder in the compositions of this invention. Low melting binders such as lead borates, lead borosilicates, lead silicates, alkali-lead borosilicates, lead alumina borosilicates, etc., may be used. The inorganic binder can be present in amounts ranging from 0–20 percent.

In the compositions of the present invention all the solids used are finely divided, i.e., they pass through a 200-mesh screen, preferably a 325-mesh screen (U.S. sieve scale).

The compositions of the invention will usually, although not necessarily, be dispersed in an inert liquid vehicle to form a paint or paste for application to various substrates. The proportion of vehicle to composition may vary considerably depending upon the manner in which the paint or paste is to be applied and the kind of vehicle utilized. Generally, from 1–20 parts by weight of solids composition (vanadium glass, and/or powdery product of glass and $SiO_2$; boron silicide; optional boron, binder and noble metal) per part by weight of vehicle will be used to produce a paint or paste of the desired consistency.

Any liquid, preferably inert, may be employed as the vehicle. Water or any one of various organic liquids, with or without thickening and/or stabilizing agents, and/or other common additives, may be utilized as the vehicle. Examples of organic liquids that can be used are the higher alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl of ethylene glycol monoacetate (butyl-0-$CH_2CH_2$-$OCOCH_3$). The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The compositions are conventionally made by admixing the components in their respective proportions. One part of vehicle for every 1–20 parts of solids mentioned above may be admixed, preferably 3–10 parts solids per part vehicle. The compositions are then applied to a dielectric body and fired to form stable electrical devices.

Application of the compositions in paint or paste form to the substrate may be effected in any desired manner. It will generally be desired, however, to effect the application in precise pattern form, which can be readily done by applying well-known screen stencil techniques or methods.

The pattern printed with the improved compositions of the present invention can be fired under such harsher conditions that can the compositions of U.S. Pat. No. 3,622,523. Thus, longer firing times and/or higher temperatures can be employed without loss of switching function, due to the reduced tendency of the compositions of the present invention to oxidize to $V_2O_5$, which as mentioned above does not exhibit a semiconductor to metal transition as does $VO_2$. Although the firing conditions, of U.S. Pat. No. 3,622,523 are adequate to produce electrical elements with the novel improved compositions of the present invention, harsher conditions may also be employed. For instance, firing in box furnaces can be used, but preferably commonly used resistor firing schedules in a belt furnace can be employed, e.g., a 45-minute cycle with a peak of 760°C. (8 minutes at peak). The temperature employed is a function of the composition used, and where large amounts of $B_xSi$ and the powdery product of $SiO_2$/glass are used, higher temperatures and longer times can be tolerated.

The compositions of this invention may also contain minor amounts of additional constituents which modify and/or improve the electrical properties of the fired elements. Due to the ability of the fired elements to transform from semiconductors to metallic behavior, widely diversified uses may be made of this invention. Consequently, it is possible to conveniently and easily apply the compositions of this invention through conventional thick film techniques to form elements which are utilized in temperature-controlling devices, temperature-alarming devices, fire-alarms, etc., and electronic devices such as display driver memories (plasma, light emitting diodes, incandescent, phosphorescent, electroluminescent, liquid crystal), solid state relays, etc.

The invention is illustrated by the following examples. In the examples and elsewhere in the specification, all parts, ratios and percentages of materials or components are by weight. Various glass compositions were melted and fritted. Each of the constituents present in the glass and the proportions thereof are reported in Table I.

TABLE I

WEIGHT PERCENT OXIDE COMPOSITION OF VANADIUM GLASSES

| Component | Glass No. 1 | 2 | 3 | 4 | 5 |
|---|---|---|---|---|---|
| $V_2O_5$ | 60.0 | 70.1 | 68.2 | 65.2 | 75 |
| $SiO_2$ | 10.0 | 1.86 | 4.5 | 8.7 | — |
| $B_2O_3$ | 5.0 | 7.48 | 7.30 | 7.0 | 3.0 |
| PbO | 10.0 | — | — | — | — |
| CdO | 5.0 | — | — | — | 9.5 |
| BaO | 5.0 | 18.7 | 18.2 | 17.4 | 9.5 |
| $P_2O_5$ | 5.0 | — | — | — | — |
| $GeO_2$ | — | — | — | — | 3.0 |
| $Al_2O_3$ | — | 1.86 | 1.80 | 1.7 | — |

In the following examples the glasses of Table I (as such or after reaction with silica as described in the examples) were utilized to prepare screen printable, air fireable compositions. The solids all had an average particle size less than 40 microns and were dispersed in an inert liquid vehicle (8 percent ethyl cellulose and 92 percent beta-terpineol) at a ratio of about 4:1. The paste compositions were screen printed (5-mil wide lines about 1-mil thick) onto a 96 percent alumina substrate onto which Ag/Pd (2/1) electrodes had been previously printed and fired. The dried prints were about 5-mils wide and about 0.5-mil thick. The printed pastes were fired to produce electrical elements which exhibited a transition from semiconductor to metallic behavior as temperature was increased.

Example 1

A composition of 1.5 g. of vanadium glass No. 2 and 0.01 g. $B_4Si$ was printed between an Ag/Pd (2/1) electrode termination on a 96 percent alumina substrate, fired at 760°C. for 10 minutes in a muffle furnace. The switching characteristics for the $Vo_2$ device thus produced were evaluated using a transistor curve tracer by measuring the threshold voltage ($V_t$) and current ($I_t$) in the "off" state and voltage and current levels in the "on" state. From these $R_{off}$, $R_{on}$ and $R_{off}/R_{on}$ were calculated. For this device $R_{off}$ was 5.4 × $10^5$ ohms, $R_{on}$ was 7.27 × $10^2$ ohms and $R_{off}/R_{on}$ was 7.4 × $10^2$.

Example 2

Another composition consisting of 1.5 g. of vanadium glass No. 4 and 0.06 g. $B_4Si$ was printed and fired as in Example 1. For this device $R_{off}$ was 6.4 × $10^4$ ohms, $R_{on}$ was 2.7 × $10^3$ ohms, and $R_{off}/R_{on}$ was 2 × $10^1$.

Example 3

A composition consisting of 1.5 g. of vanadium glass No. 1 and 0.15 g. $B_4Si$ was printed between Ag/Pd electrode terminations on a 96 percent alumina substrate. The coated substrate was fired through the belt furnace with a peak temperature of 760°C. The total heating profile lasted about 45 minutes, with about 8 minutes at peak (760°C.) and about 19 minutes to reach peak and about 19 minutes to cool down from peak (rates of about 40°C./min. in each instance). The switching characteristics for the $VO_2$ device thus processed were: $R_{off}$ was 1.14 × $10^6$ ohms, $R_{on}$ was 3.7 × $10^3$ ohms, and $R_{off}/R_{on}$ was 3 × $10^2$.

Example 4

A composition consisting of 1.5 g. of vanadium glass No. 4, 0.06 g. $B_4Si$ and 0.04 g. B printed between Ag/Pd electrode terminations on a 96 percent alumina substrate and heated in a belt furnace as in Example 3. For this $VO_2$ device: $R_{off}$ was 1.82 × $10^5$ ohms, $R_{on}$ was 1 × $10^3$ ohms, and $R_{off}/R_{on}$ was 1.8 × $10^2$.

Example 5

A powdery product was prepared as follows: 10.0 g. of vanadium glass No. 3 was intimately mixed with 2.4 g. of 0.01 micron $SiO_2$ and fired at 700°C. for 15 minutes. The product was milled, refired for 15 minutes at 700°C., and then milled overnight. The resultant powder (Powder A) was used to make the following. A composition of 1.0 g. of Powder A and 0.09 g. $B_4Si$ was printed on a substrate containing 32 Ag/Pd terminations. This was fired through the belt furnace as in Example 3 (peak temperature 760°C.). Good switching characteristics were observed for all 32 switches: off resistance was about 4 megaohms with $V_t$ of 400–500 volts and $I_t$ of 0.1–0.2 mA. Improved switch reproducibility was obtained over vanadium glass No. 3 fired through same profile (without $SiO_2$ additions).

Example 6

An inorganic binder, component (4), was used here. A composition of 1.0 g. Powder A, 0.09 g. $B_4Si$, and 0.01 g. B was printed on a substrate containing 32 Ag/Pd terminations. Firing was in a belt furnace as in Example 3 (peak temperature 760°C.). Although good print definition and switching characteristics were obtained, improved reproducibility of threshold voltages and print definition were obtained when an inorganic glass binder was added to the same composition, i.e., a composition containing 1.0 g. Powder A, 0.09 g. $B_4Si$, 0.01 g. B, and 0.13 g. glass binder (63 percent PbO, 10 percent $B_2O_3$, 26.4 percent $SiO_2$ and 0.7 percent $Al_2O_3$) was fired through the temperature profile.

Example 7

A series of runs was made using the optional noble metal component (3). Ag powder was added to compositions containing Powder A to lower the resistivity of the composition. The formulas and average resistances are given in Table II.

TABLE II

| Components | Weight (in grams) in Run No. (a) | (b) | (c) | (d) |
|---|---|---|---|---|
| Powder A ($SiO_2$/glass) | 1 | 1 | 1 | 1 |
| $B_4Si$ | 0.08 | 0.08 | 0.08 | 0.08 |
| B | 0.01 | 0.01 | 0.01 | 0.01 |
| Ag | 0.10 | 0.20 | 0.30 | 0.40 |
| Binder of Example 6 | 0.14 | 0.14 | 0.14 | 0.15 |
| Vehicle | 0.45 | 0.47 | 0.50 | 0.52 |
| Avg. Off-State Resistance (megaohms) | 15 | 11 | 5.3 | 4.7 |

Example 8

A composition consisting of 1.0 g. Powder A, 0.09 g. $B_6Si$, and 0.13 g. glass binder of Example 6 was printed on a substrate containing 32 Ag/Pd terminations. This was fired through the belt furnace using the profile of Example 3. Good print definition was observed on all 32 elements. Switching characteristics were determined for 19 of 32 elements. For these elements $R_{off}$ (ave) was 2.70 × $10^6$ ohms; $R_{on}$ (ave) was 8.16 × $10^3$ ohms; $R_{off}/R_{on}$ (ave) was 3.41 × $10^2$ ohms.

Example 9

A composition of 1.5 g. of glass No. 5 and 0.15 g. B was printed between Ag/Pd terminations on a 96 percent alumina substrate and fired through the belt furnace (760°C. peak) as in Example 3. Complete oxidation of $VO_2$ to $V_2O_5$ occurred and no switching characteristics were observed.

However, better behavior was observed using an $SiO_2$/glass powdery product. An intimate mixture of 80 weight percent vanadium glass No. 5 and 20 weight percent 0.01 micron $SiO_2$ was fired as in Example 5 (Powder B). A composition consisting of 1.0 g. of Powder B, 0.07 g. $B_4Si$, 0.02 g. B, and 0.13 g. glass binder of Example 6 was printed on a substrate containing 32 Ag/Pd terminations and fired through a belt furnace (760°C.) as in Example 3. Good print definition and switching characteristics were observed on 31 out of 32 elements (one switch had been destroyed to examine adherence microscopically).

A composition consisting of 1.3 g. vanadium glass No. 5, 0.1 g. boron, 0.2 g. silver and 0.4 of frit (68.4 percent PbO, 13 percent $B_2O_3$, 9.3 percent $SiO_2$, and 9.3 percent CdO) was printed on a 96 percent alumina substrate and fired through a 700°C. peak temperature belt furnace at different total lengths of time ranging from 6 minutes to 22 minutes. Elements run at 22 minutes were completely oxidized from $VO_2$ to $V_2O_5$ and the element had run over the substrate. Elements run at 12 minutes showed some oxidation but exhibited mainly thermistor characteristics. Elements run at 8 minutes showed some oxidation but exhibited switching characteristics. Elements run for 6 minutes showed no oxidation and very good switching characteristics.

We claim:

1. A screen printable, air fireable composition useful for preparing thermal switches, comprising, on a weight basis, (1) 35–99 percent of a powdery product of vanadium glass and silica, (2) 1–15 percent finely divided compound(s) of the formula $B_xSi$, where $x$ is about 4–6, (3) 0–50 percent of finely divided noble metal, and (4) 0–20 percent low melting inorganic binder; wherein vanadium glass (1) contains 5–55 percent vanadium, calculated as metal; and wherein said powdery product of vanadium glasss and silica is obtained by heating vanadium glass and silica at or above the softening point of the vanadium glass, the silica having an average particle size of no more than about 40 microns, the amount of silica uses to produce said powdery product being no more than about 40 percent of the weight of the vanadium glass therein.

2. A composition according to claim 1 wherein component (2) additionally comprises finely divided boron with one or more compounds $B_xSi$ in finely divided form, the total amount of boron and $B_xSi$ being in the range of 1–15 percent, and the total amount of elemental boron in component (2) being no more than about 40 percent of the total weight of component (2).

3. A composition in accordance with claim 1 which is dispersed in an inert liquid vehicle.

4. A composition in accordance with claim 2 which is dispersed in an inert liquid vehicle.

5. A composition in accordance with claim 1 wherein the amount of silica in said powdery product in claim 1 is in the range 10–25 percent of the weight of the vanadium glass.

6. A composition in accordance with claim 2 wherein the amount of silica in said powdery product in claim 2 is in the range 10–25 percent of the weight of the vanadium glass.

7. A composition in accordance with claim 5 which is dispersed in an inert liquid vehicle.

8. A composition in accordance with claim 6 which is dispersed in an inert liquid vehicle.

* * * * *